United States Patent
Umeyama et al.

(10) Patent No.: US 10,454,098 B2
(45) Date of Patent: Oct. 22, 2019

(54) NONAQUEOUS ELECTROLYTE SECONDARY BATTERY INCLUDING A POSITIVE ELECTRODE HAVING A POSITIVE ELECTRODE MIXTURE LAYER INCLUDING A FIRST POWDER AND A SECOND POWDER

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Keisuke Ohara, Osaka (JP); Yusuke Fukumoto, Toyonaka (JP); Yuji Yokoyama, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/325,639

(22) PCT Filed: May 29, 2015

(86) PCT No.: PCT/JP2015/002730
§ 371 (c)(1),
(2) Date: Jan. 11, 2017

(87) PCT Pub. No.: WO2016/013142
PCT Pub. Date: Jan. 28, 2016

(65) Prior Publication Data
US 2017/0170464 A1    Jun. 15, 2017

(30) Foreign Application Priority Data
Jul. 24, 2014 (JP) .................................. 2014-150909

(51) Int. Cl.
*H01M 4/36* (2006.01)
*H01M 4/04* (2006.01)
(Continued)

(52) U.S. Cl.
CPC .......... *H01M 4/364* (2013.01); *H01M 4/043* (2013.01); *H01M 4/0404* (2013.01);
(Continued)

(58) Field of Classification Search
CPC ...... H01M 4/364; H01M 4/621; H01M 4/043; H01M 10/0525; H01M 4/0404; H01M 2004/028
(Continued)

(56) References Cited

U.S. PATENT DOCUMENTS

2008/0299457 A1*  12/2008  Muraoka ............. H01M 4/0404
                                                   429/217
2016/0197339 A1*  7/2016  Tanjo ..................... H01M 4/62
                                                   429/217

FOREIGN PATENT DOCUMENTS

JP    2000-036323 A    2/2000
JP    2005-174631 A    6/2005
(Continued)

*Primary Examiner* — Gary D Harris
(74) *Attorney, Agent, or Firm* — Sughrue Mion, PLLC

(57) ABSTRACT

A nonaqueous electrolyte secondary battery includes a positive electrode, a negative electrode, a separator provided between the positive electrode and the negative electrode, and a nonaqueous electrolytic solution at least held by the separator. The positive electrode has a positive electrode collector and a positive electrode mixture layer provided on the positive electrode collector. The positive electrode mixture layer has a first powder and a second powder. The first powder includes a first positive electrode active material, a first conductive material, and an organic-based binder. The second powder includes a second positive electrode active material, a second conductive material, and a water-based binder.

9 Claims, 7 Drawing Sheets

(51) Int. Cl.

|  |  |
|---|---|
| *H01M 4/131* | (2010.01) |
| *H01M 4/525* | (2010.01) |
| *H01M 4/62* | (2006.01) |
| *H01M 4/66* | (2006.01) |
| *H01M 10/0525* | (2010.01) |
| *H01M 4/02* | (2006.01) |

(52) U.S. Cl.
CPC ........... *H01M 4/131* (2013.01); *H01M 4/366* (2013.01); *H01M 4/525* (2013.01); *H01M 4/621* (2013.01); *H01M 4/623* (2013.01); *H01M 4/661* (2013.01); *H01M 4/667* (2013.01); *H01M 10/0525* (2013.01); *H01M 2004/028* (2013.01)

(58) Field of Classification Search
USPC ........................................................ 429/217
See application file for complete search history.

(56) References Cited

FOREIGN PATENT DOCUMENTS

| JP | 2005-340188 A | 12/2005 |
| JP | 2008-300302 A | 12/2008 |
| WO | 2014/098037 A1 | 6/2014 |

\* cited by examiner

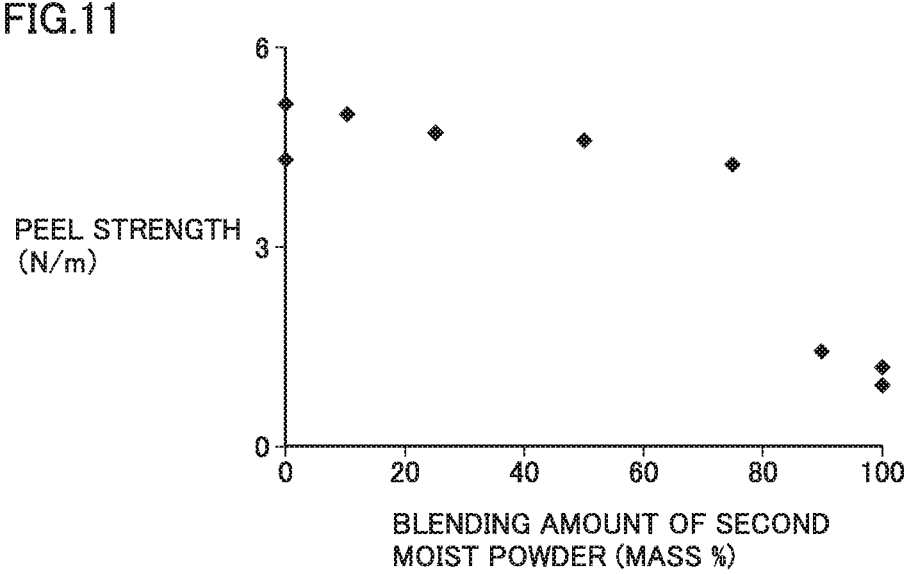

NONAQUEOUS ELECTROLYTE SECONDARY BATTERY INCLUDING A POSITIVE ELECTRODE HAVING A POSITIVE ELECTRODE MIXTURE LAYER INCLUDING A FIRST POWDER AND A SECOND POWDER

CROSS REFERENCE TO RELATED APPLICATIONS

This application is a National Stage of International Application No. PCT/JP2015/002730, filed on May 29, 2015, which claims priority from Japanese Patent Application No. 2014-150909, filed on Jul. 24, 2014, the contents of all of which are incorporated herein by reference in their entirety.

TECHNICAL FIELD

The present invention relates to a nonaqueous electrolyte secondary battery.

BACKGROUND ART

Patent Literature 1 (Japanese Patent Laying-Open No. 2005-340188) describes that an active material containing layer of an electrode usable for an electrochemical device includes: a plurality of particles containing an active material; and a binder (this binder combines the particles containing the active material with one another and combines the particles containing the active material with a collector).

CITATION LIST

Patent Literature

[PTL 1] Japanese Patent Laying-Open No. 2005-340188

SUMMARY OF INVENTION

Technical Problem

In recent years, a nonaqueous electrolyte secondary battery has been required to be operable not only at a normal temperature but also at a low temperature. Accordingly, the nonaqueous electrolyte secondary battery has been required to attain not only reduction of I-V resistance at a normal temperature but also reduction of I-V resistance at a low temperature. The present invention has an object to provide a nonaqueous electrolyte secondary battery capable of reducing I-V resistance at a normal temperature and I-V resistance at a low temperature. It should be noted that, in the present specification, the "normal temperature" refers to a temperature higher than 0° C., such as not less than 20° C. and not more than 30° C. Moreover, the "low temperature" refers to a temperature less than 0° C., such as not less than −30° C. and not more than −10° C.

Solution to Problem

Conventionally, as a method for producing a positive electrode of a nonaqueous electrolyte secondary battery, there has been known a method in which an organic-based slurry containing a positive electrode active material, a conductive material, an organic solvent, and an organic-based binder dissoluble in the organic solvent is applied onto a surface of the positive electrode collector and is dried. In recent years, in order to reduce cost accompanied by facilities or treatments for reducing load on environment (for example, for reducing harmfulness of the organic solvent removed from the organic-based slurry), there has been proposed a method in which a water-based slurry containing a positive electrode active material, a conductive material, and a water-based solvent, and a water-based binder dispersible in the water-based solvent is applied onto a surface of a positive electrode collector and is dried.

In the case where a positive electrode is produced using an organic-based slurry, it is difficult to attain reduction of I-V resistance of the nonaqueous electrolyte secondary battery at a low temperature while it is possible to attain reduction of I-V resistance of the nonaqueous electrolyte secondary battery at a normal temperature. On the other hand, in the case where a positive electrode is produced using a water-based slurry, it is difficult to attain reduction of resistance of a nonaqueous electrolyte secondary battery at a normal temperature while it is possible to attain reduction of I-V resistance of the nonaqueous electrolyte secondary battery at a low temperature. Based on these facts, the present inventors considered that by producing a positive electrode using a mixture of an organic-based slurry and a water-based slurry, it may be possible to attain both the reduction of the I-V resistance of the nonaqueous electrolyte secondary battery at a normal temperature and the reduction of the I-V resistance of the nonaqueous electrolyte secondary battery at a low temperature.

However, when the organic-based slurry and the water-based slurry were (nixed with each other, the mixture was gelled. Accordingly, the mixture of the organic-based slurry and the water-based slurry could not be applied onto the surface of the positive electrode collector, with the result that it was found that a positive electrode cannot be produced using the mixture of the organic-based slurry and the water-based slurry.

The present inventors examined diligently a reason why the mixture of the organic-based slurry and the water-based slurry is gelled, and arrived at the following conclusion. Generally, in the water-based slurry, it is said that lithium ions are likely to be eluted from the positive electrode active material to the water-based solvent. Accordingly, the water-based slurry exhibits alkalinity as a whole. Hence, with the above-described mixture, the organic-based slurry is brought into contact with the slurry (water-based slurry) exhibiting alkalinity.

In the organic-based slurry, the binder (organic-based binder) is dissolved in the organic solvent. Accordingly, when the organic-based slurry is brought into contact with the slurry exhibiting alkalinity, the organic-based binder is likely to be brought into contact with the slurry exhibiting alkalinity, with the result that the organic-based binder is gelled. The present inventors considered that this is the reason why the mixture of the organic-based slurry and the water-based slurry was gelled.

According to the knowledge thus obtained by the present inventors, it is considered that the mixture of the organic-based slurry and the water-based slurry can be prevented from being gelled, if the lithium ions eluted to the water-based solvent can be avoided from being brought into contact with the organic-based binder contained in the organic-based slurry. In consideration of such a fact that the organic-based binder contained in the organic-based slurry is dissolved in the organic solvent, it is considered that the mixture can be prevented from being gelled, if the water-based solvent and the organic solvent can be avoided from being brought into contact with each other.

Meanwhile, as another method for producing a positive electrode of a nonaqueous electrolyte secondary battery, the present inventors have proposed a method in which a moist powder is produced using a positive electrode active material, a conductive material, a solvent, and a binder dissoluble or dispersible in the solvent and then the moist powder is transferred onto a surface of the positive electrode collector. In the moist powder, it is considered that due to surface tension of the solvent existing between a particle (one of the positive electrode active material, the conductive material, and the binder dispersed in the solvent, for example) and a particle (one of the positive electrode active material, the conductive material, and the binder dispersed in the solvent, for example), the particles are adhered to each other and are formed into a powdery body. Hence, the solvent when it is in the moist powder is more stable than the solvent when it is on the surface of the moist powder, so that no solvent is leaked from within the moist powder unless external force is provided to the moist powder. Accordingly, it is considered that only a very few amount of the solvent exists on the surface of the moist powder. In particular, in the case where an organic solvent is used as the solvent, the organic solvent is unlikely to exist on the surface of the moist powder because the organic solvent is likely to be volatilized, so that it is considered that most of the organic solvent exists in the moist powder. The present inventors considered that if this method is used to produce a positive electrode of a nonaqueous electrolyte secondary battery, the water-based solvent and the organic solvent can be avoided from being brought into contact with each other and therefore the gelling may be prevented.

In view of such a consideration, a nonaqueous electrolyte secondary battery of the present invention was completed. The nonaqueous electrolyte secondary battery of the present invention includes a positive electrode, a negative electrode, a separator provided between the positive electrode and the negative electrode, and a nonaqueous electrolytic solution at least held by the separator. The positive electrode has a positive electrode collector and a positive electrode mixture layer provided on the positive electrode collector. The positive electrode mixture layer has a first powder and a second powder, the first powder including a first positive electrode active material, a first conductive material, and an organic-based binder, the second powder including a second positive electrode active material, a second conductive material, and a water-based binder.

In the "first powder", the organic-based binder exists between the first positive electrode active materials to adhere the first positive electrode active materials to each other, and exists between the first positive electrode active material and the first conductive material to adhere the first positive electrode active material and the first conductive material to each other. A part of the organic-based binder may exist on the surface of the first powder. The first powder may further include a material different from the first positive electrode active material, the first conductive material, and the organic-based binder. The "organic-based binder" refers to a binder dissoluble in an organic solvent.

In the "second powder", the water-based binder is wound around the surface of the aggregated material. In the aggregated material, the second positive electrode active materials are in contact with each other, or the second positive electrode active material and the second conductive material are in contact with each other. Because the water-based binder is wound around the surface of the aggregated material, the contact state between the second positive electrode active materials and the contact state between the second positive electrode active material and the second conductive material are maintained. The second powder may further include a material (for example, a thickener) different from the second positive electrode active material, the second conductive material, and the water-based binder. The "water-based binder" refers to a binder dispersible in the water-based solvent. A representative example of the "water-based solvent" is water. The "water-based solvent" also includes water containing a small amount of alcohol.

In the nonaqueous electrolyte secondary battery described above, since the positive electrode mixture layer has the first powder and the second powder, the I-V resistance at a normal temperature and the I-V resistance at a low temperature can be reduced. Although not with absolute certainty, such a function is attained presumably due to a synergistic effect of an effect resulting from the positive electrode mixture layer having the first powder and an effect resulting from the positive electrode mixture layer having the second powder.

The positive electrode mixture layer preferably includes not less than 10 mass % and not more than 75 mass % of the second powder. When the positive electrode mixture layer includes not less than 10 mass % of the second powder, the I-V resistance of the nonaqueous electrolyte secondary battery at a low temperature can be reduced further. When the positive electrode mixture layer includes not more than 75 mass % of the second powder, the content of the first powder in the positive electrode mixture layer can be secured, whereby the I-V resistance of the nonaqueous electrolyte secondary battery at a normal temperature can be reduced further.

The positive electrode included in the nonaqueous electrolyte secondary battery of the present invention is preferably produced in accordance with the following method. First, a first moist powder including the first positive electrode active material, the first conductive material, the organic solvent, and the organic-based binder is prepared, and a second moist powder including the second positive electrode active material, the second conductive material, the water-based solvent, and the water-based binder is prepared. Next, the first moist powder and the second moist powder are mixed with each other. Accordingly, the organic solvent and the water-based solvent can be avoided from being brought into contact with each other. Accordingly, gelling can be prevented during mixing of the first moist powder and the second moist powder. Then, the mixture of the first moist powder and the second moist powder is transferred onto a surface of the positive electrode collector.

The "first moist powder" refers to a moist powder including not less than 75 mass % of a first solid content (the first positive electrode active material, the first conductive material, and the organic-based binder). The organic-based binder is dissolved in the organic solvent included in the first moist powder. It should be noted that the organic-based binder is dissolved in the organic solvent in the first moist powder, but is regarded as one of the components of the first solid content in the present specification.

The "second moist powder" refers to a moist powder including not less than 75 mass % of a second solid content (the second positive electrode active material, the second conductive material, and the water-based binder). The water-based binder is dispersed in the water-based solvent included in the second moist powder.

Advantageous Effects of Invention

In the nonaqueous electrolyte secondary battery of the present invention, it is possible to reduce the I-V resistance at a normal temperature and the I-V resistance at a low temperature.

BRIEF DESCRIPTION OF DRAWINGS

FIG. 11 is a graph showing a result of the example.

DESCRIPTION OF EMBODIMENTS

Figure 1:
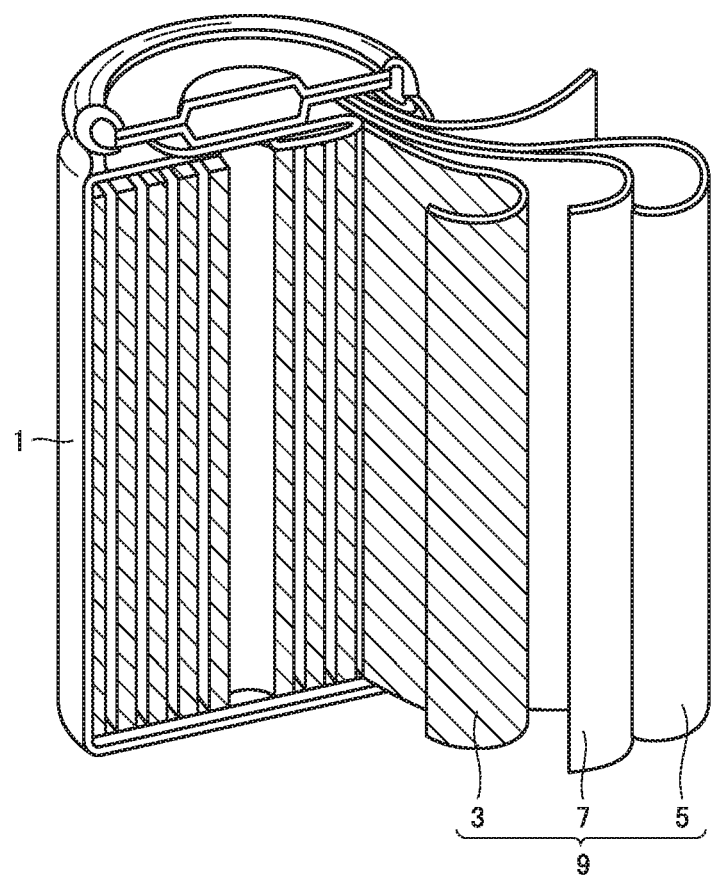
FIG. 1 is a cross sectional perspective view of a nonaqueous electrolyte secondary battery in one embodiment of the present invention.

The following describes the present invention with reference to figures. It should be noted that in the figures of the present invention, the same reference character indicates the same or corresponding portion. Moreover, for clarity and simplicity of the figures, dimensional relations, such as length, width, thickness, and depth are changed appropriately, and do not represent actual dimensional relations.

Configuration of Nonaqueous Electrolyte Secondary Battery

FIG. 1 is a cross sectional perspective view of a nonaqueous electrolyte secondary battery in one embodiment of the present invention. The nonaqueous electrolyte secondary battery of the present embodiment has a battery case 1 in which an electrode body 9 is accommodated together with a nonaqueous electrolytic solution (not shown). Electrode body 9 includes a positive electrode 3, a negative electrode 5, and a separator 7 provided between positive electrode 3 and negative electrode 5.

<Positive Electrode>

Figure 2:
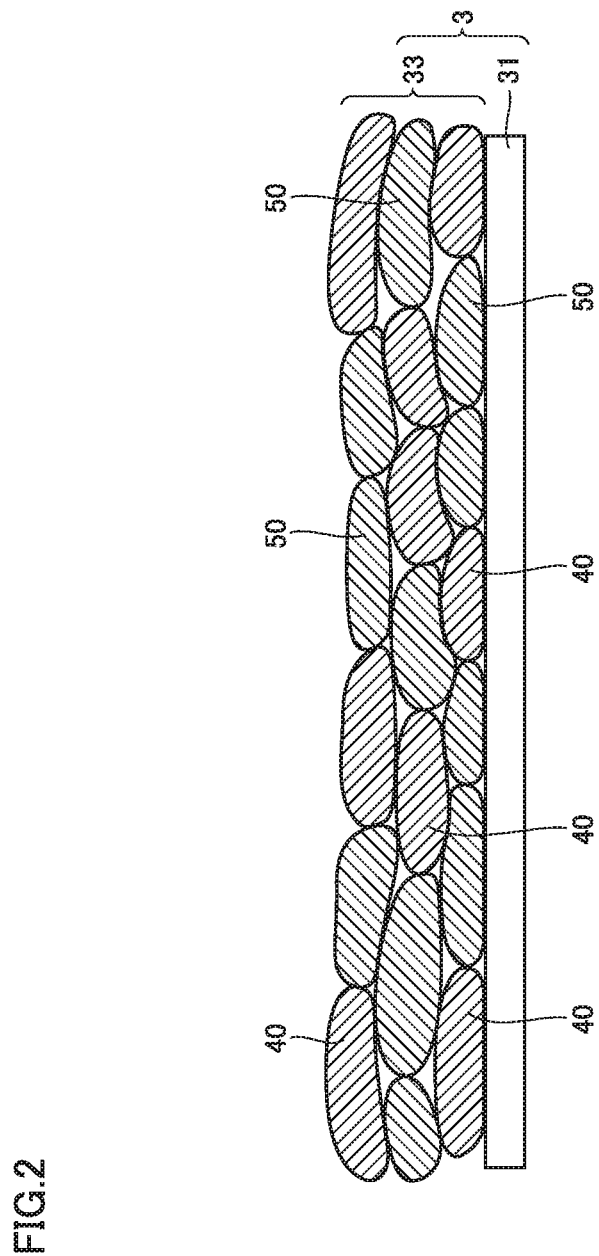
FIG. 2 is a plan view schematically showing a positive electrode.
Figure 3:
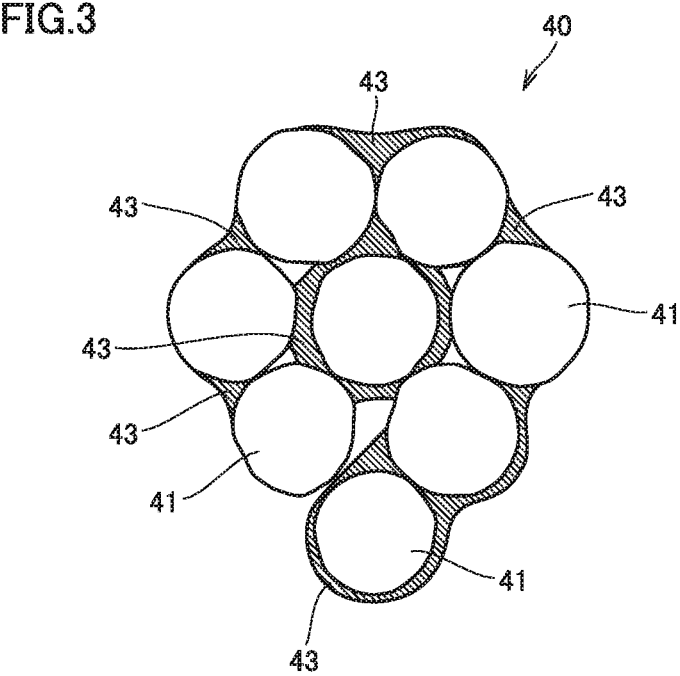
FIG. 3 is a cross sectional view schematically showing a first powder.
Figure 4:
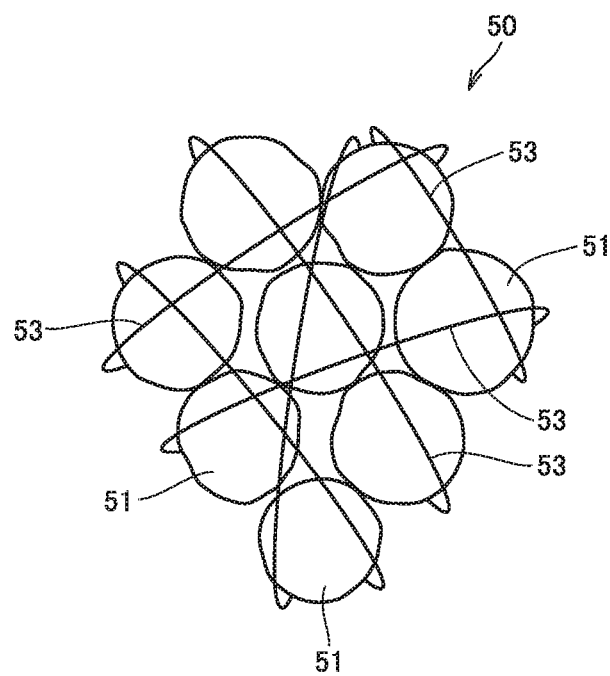
FIG. 4 is a plan view schematically showing a second powder.

FIG. 2 is a plan view schematically showing the positive electrode of the present embodiment. FIG. 3 is a cross sectional view schematically showing a first powder included in the positive electrode. FIG. 4 is a plan view schematically showing a second powder included in the positive electrode.

Positive electrode 3 has a positive electrode collector 31 and a positive electrode mixture layer 33 provided on positive electrode collector 31. Positive electrode mixture layer 33 has first powders 40 and second powders 50. Each of first powders 40 includes first positive electrode active materials 41, a first conductive material (not shown), and an organic-based binder 43. Each of second powders 50 includes second positive electrode active materials 51, a second conductive material (not shown), and a water-based binder 53. Since positive electrode mixture layer 33 has first powder 40 and second powder 50 in this way, I-V resistance at a normal temperature and I-V resistance at a low temperature can be reduced. Accordingly, the nonaqueous electrolyte secondary battery of the present embodiment becomes capable of not only an operation at a normal temperature but also an operation at a low temperature. Accordingly, the use of the nonaqueous electrolyte secondary battery of the present embodiment provides a power source exhibiting an excellent characteristic even under a low temperature environment of a cold district, inside of a freezer, or the like, such as a power source for IT instruments (such as mobile phones or notebook PCs (personal computers)), a power source for vehicles, a power source for factories, or a power source for houses. Although not with absolute certainty, such an effect is attained presumably due to the following reason.

Positive electrode mixture layer 33 has first powder 40 and second powder 50. Accordingly, it is considered that the resistance of positive electrode 3 is dependent on the resistance of first powder 40 and the resistance of second powder 50.

At a normal temperature, the resistance of first powder 40 is lower than the resistance of second powder 50. Accordingly, it is considered that the resistance of positive electrode 3 becomes lower than the resistance thereof when the positive electrode mixture layer does not include first powder 40 and is only constructed of second powder 50.

On the other hand, at a low temperature, the resistance of second powder 50 is lower than the resistance of first powder 40. Accordingly, it is considered that the resistance of positive electrode 3 becomes lower than the resistance thereof when the positive electrode mixture layer does not include second powder 50 and is only constructed of first powder 40.

Moreover, the following effect can also be obtained in the present embodiment. Generally, when a mixture layer is formed using a moist powder containing a water-based slurry or a water-based binder, adhesive strength between the mixture layer and a collector is decreased as compared with a case where the mixture layer is formed using a moist powder containing an organic-based slurry or an organic-based binder. However, positive electrode mixture layer 33 includes not only second powder 50 but also first powder 40. Accordingly, it is considered that the adhesive strength between positive electrode collector 31 and positive electrode mixture layer 33 can be secured as compared with a case where the positive electrode mixture layer does not include first powder 40 and is only constructed of second powder 50. In this way, positive electrode mixture layer 33 can be prevented from being peeled from positive electrode collector 31 during production or the like of the nonaqueous electrolyte secondary battery, whereby nonaqueous electrolyte secondary batteries excellent in safety can be produced with a good yield.

There is no particular limitation as to the content of first powder 40 and the content of second powder 50 in positive electrode mixture layer 33. Preferably, positive electrode mixture layer 33 includes not less than 25 mass % and not more than 90 mass % of first powder 40. When positive electrode mixture layer 33 includes not less than 25 mass % of first powder 40, the I-V resistance of the nonaqueous electrolyte secondary battery at a normal temperature can be reduced further. When positive electrode mixture layer 33 includes not more than 90 mass % of first powder 40, positive electrode mixture layer 33 includes not less than 10 mass % of second powder 50, whereby the I-V resistance of the nonaqueous electrolyte secondary battery at a low temperature can be reduced further. More preferably, positive electrode mixture layer 33 includes not less than 50 mass % and not more than 75 mass % of first powder 40. As a method of calculating the content of first powder 40, the following method can be exemplified, although there might be a different method therefor because the method of calculating the content of first powder 40 depends on types of organic-based binder 43 and water-based binder 53. For example, when organic-based binder 43 includes fluorine atoms and water-based binder 53 does not include fluorine atoms, an EPMA (Electron Probe Micro Analyzer) or the like is used to observe distribution of the fluorine atoms so as to find an occupation ratio of first powder 40 and an occupation ratio of second powder 50, thereby finding the content of first powder 40.

Moreover, positive electrode mixture layer 33 preferably includes not less than 10 mass % and not more than 75 mass % of second powder 50. When positive electrode mixture layer 33 includes not less than 10 mass % of second powder 50, the I-V resistance of the nonaqueous electrolyte secondary battery at a low temperature can be reduced further. When positive electrode mixture layer 33 includes not more than 75 mass % of second powder 50, positive electrode mixture layer 33 includes not less than 25 mass % of first powder 40, whereby the I-V resistance of the nonaqueous electrolyte secondary battery at a normal temperature can be reduced further. More preferably, positive electrode mixture layer 33 includes not less than 25 mass % and not more than 50 mass % of second powder 50. The content of second powder 50 can be found by a method similar to the method of finding the content of first powder 40.

Organic-based binder 43 exists not only in first powder 40 but also on the surface of first powder 40, and is provided between adjacent first positive electrode active materials 41 (FIG. 3). On the other hand, water-based binder 53 exists on the surface of second powder 50, and is provided to span adjacent second positive electrode active materials 51 (FIG. 4). Here, a positional relation between the positive electrode active material and the binder in positive electrode mixture layer 33 can be confirmed based on a cross sectional SEM (scanning electron microscope) image of positive electrode mixture layer 33. Accordingly, by observing the cross sectional SEM image of positive electrode mixture layer 33, it can be confirmed whether or not positive electrode mixture layer 33 includes both first powder 40 and second powder 50.

It should be noted that in positive electrode mixture layer 33, first powders 40, first powder 40 and second powder 50, or first powder 40 and positive electrode collector 31 are adhered to each other by organic-based binder 43 existing on the surface of first powder 40. In addition, second powders 50, first powder 40 and second powder 50, or second powder 50 and positive electrode collector 31 are adhered to each other by water-based binder 53.

(First Powder)

In first powder 40, the content of organic-based binder 43 can be made smaller than that in the organic-based slurry. Preferably, first powder 40 includes: not less than 86 mass % and not more than 99.3 mass % of first positive electrode active material 41; not less than 0.2 mass % and not more than 4 mass % of organic-based binder 43; and not less than 0.5 mass % and not more than 10 mass % of the first conductive material.

Preferably, first positive electrode active material 41 is shaped in the form of a particle. For first positive electrode active material 41, a material conventionally well-known as a positive electrode active material of a nonaqueous electrolyte secondary battery can be used, such as a complex oxide including lithium and one or more of transition metal elements.

Preferably, organic-based binder 43 exists uniformly in first powder 40. For organic-based binder 43, a material conventionally well-known as an organic-based binder included in a positive electrode mixture layer of a nonaqueous electrolyte secondary battery can be used, such as PVDF (PolyVinylidene DiFluoride), PEO (polyethylene oxide), PAN (polyacrylonitrile), or PMMA (poly(methylmethacrylate)).

Preferably, the first conductive material exists uniformly in first powder 40. For the first conductive material, a material conventionally well-known as a conductive material included in a positive electrode mixture layer of a nonaqueous electrolyte secondary battery can be used, such as a carbon material such as acetylene black.

It should be noted that the form of first powder 40 is not limited to the form shown FIG. 3. For example, the shape of first powder 40, the shape of first positive electrode active material 41, the shape of organic-based binder 43, and the like are not limited to the shapes shown in FIG. 3. The number of first positive electrode active materials 41 is not limited to the number shown in FIG. 3.

(Second Powder)

In second powder 50, the content of water-based binder 53 can be made smaller than that in the water-based slurry. Preferably, second powder 50 includes: not less than 86 mass % and not more than 99.3 mass % of second positive electrode active material 51; not less than 0.2 mass % and not more than 4 mass of water-based binder 53; and not less than 0.5 mass % and not more than 10 mass % of the second conductive material.

Preferably, second positive electrode active material 51 is shaped in the form of a particle. For second positive electrode active material 51, a material conventionally well-known as a positive electrode active material of a nonaqueous electrolyte secondary battery can be used, such as a complex oxide including lithium and one or more of transition metal elements. Second positive electrode active material 51 may be made of the same material as first positive electrode active material 41, or may be made of a material different from first positive electrode active material 41.

Preferably, water-based binder 53 exists uniformly in second powder 50. For water-based binder 53, a material conventionally well-known as a water-based binder included in a positive electrode mixture layer of a nonaqueous electrolyte secondary battery can be used, such as PTFE (polytetrafluoroethylene), FEP (Fluoro Ethylene Propylene), or PFA (Perfluoroalkoxy).

Preferably, the second conductive material exists uniformly in second powder 50. For the second conductive material, a material conventionally well-known as a conductive material included in a positive electrode mixture layer of a nonaqueous electrolyte secondary battery can be used, such as a carbon material such as acetylene black. The second conductive material may be made of the same material as the first conductive material or may be made of a material different from the first conductive material.

It should be noted that the form of second powder 50 is not limited to the form shown in FIG. 4. For example, the shape of second powder 50, the shape of second positive electrode active material 51, the shape of water-based binder 53, and the like are not limited to the shapes shown in FIG. 4. The number of second positive electrode active materials 51 is not limited to the number shown in FIG. 4.

Heretofore, positive electrode 3 has been described, but in positive electrode 3, positive electrode collector 31 preferably has a configuration conventionally well-known as a positive electrode collector of a nonaqueous electrolyte secondary battery, and it is not limited to a configuration described in examples below. Positive electrode mixture layer 33 may be provided on each of the surfaces of positive electrode collector 31. On a surface of positive electrode collector 31 provided with positive electrode mixture layer 33, a portion (positive electrode side non-applied portion) in which positive electrode collector 31 is exposed from positive electrode mixture layer 33 is preferably provided at one end in the width direction of positive electrode collector 31. The positive electrode side non-applied portion is preferably electrically connected to a positive electrode terminal provided in battery case 1 (the cover body of battery case 1, for example). It should be noted that "the width direction of positive electrode collector 31" refers to a direction that is perpendicular to the longitudinal direction of positive electrode collector 31 when electrode body 9 is not formed and that is different from the thickness direction of positive electrode 3. The same applies to the width direction of the negative electrode collector.

<Negative Electrode>

Preferably, negative electrode 5 has a configuration conventionally well-known as a negative electrode of a nonaqueous electrolyte secondary battery. For example, negative electrode 5 preferably has a negative electrode collector and a negative electrode mixture layer provided on the negative electrode collector. The negative electrode mixture layer may be provided on one surface of the negative electrode collector, or may be provided on each of the surfaces of the negative electrode collector. On a surface of the negative electrode collector provided with the negative electrode mixture layer, a portion (negative electrode side non-applied portion) in which the negative electrode collector is exposed from the negative electrode mixture layer is preferably provided at one end in the width direction of the negative electrode collector. The negative electrode side non-applied portion is preferably electrically connected to a negative electrode terminal provided in battery case 1 (the case body of battery case 1, for example).

Preferably, the negative electrode collector has a configuration conventionally well-known as a negative electrode collector of a nonaqueous electrolyte secondary battery, and is not limited to a configuration described in the examples below.

Preferably, the negative electrode mixture layer includes a negative electrode active material and a binder. For the negative electrode active material, a material conventionally well-known as a negative electrode active material of a nonaqueous electrolyte secondary battery can be used, such as a carbon material mainly composed of natural graphite. For the binder, a material conventionally well-known as a binder included in a negative electrode mixture layer of a nonaqueous electrolyte secondary battery can be used, such as SBR (styrene-butadiene rubber). For each of the contents of the negative electrode active material and the binder in the negative electrode mixture layer, each of the contents in the negative electrode mixture layer of the nonaqueous electrolyte secondary battery can be applied without any particular limitation.

<Separator>

Preferably, separator 7 has a configuration conventionally well-known as a separator of a nonaqueous electrolyte secondary battery, and is not limited to a configuration described, in the examples below.

<Nonaqueous Electrolytic Solution>

Preferably, the nonaqueous electrolytic solution has a composition conventionally well-known as a nonaqueous electrolytic solution of a nonaqueous electrolyte secondary battery, and is not limited to a composition described in the examples below.

Production of Nonaqueous Electrolyte Secondary Battery

Electrode body 9 is produced using positive electrode 3 which is produced in accordance with the below-described method, separator 7, and negative electrode 5, and is thereafter accommodated in battery case 1, which is then sealed. Then, the nonaqueous electrolytic solution is introduced from a liquid introduction opening formed in battery case 1, and the liquid introduction opening is then sealed. In this way, the nonaqueous electrolyte secondary battery of the present embodiment can be produced. The following describes a preferable method for producing positive electrode 3.

<Production of Positive Electrode>

Figure 5:
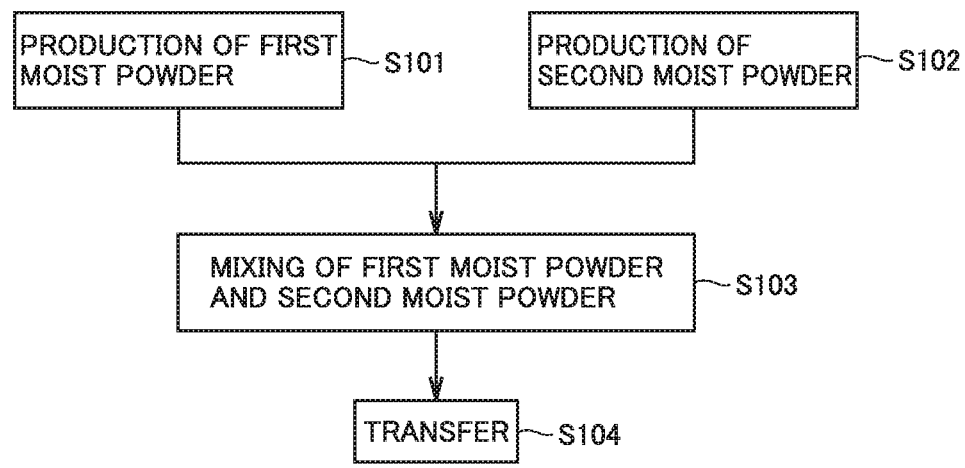
FIG. 5 is a flowchart showing a method for producing the positive electrode of the nonaqueous electrolyte secondary battery in the embodiment of the present invention in the order of steps.
Figure 6:
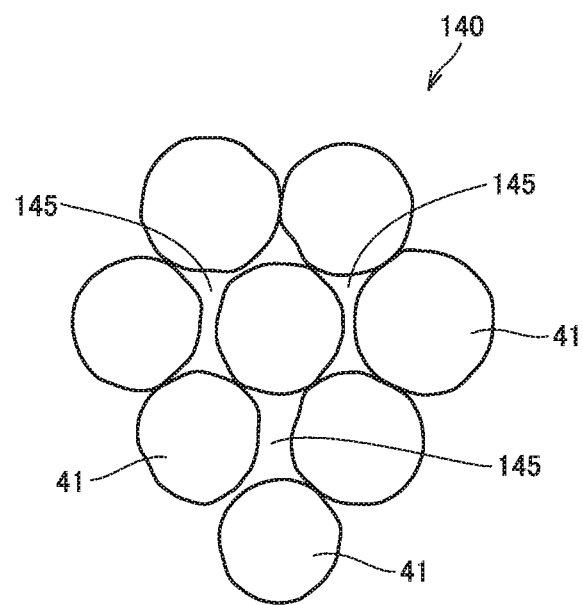
FIG. 6 is a cross sectional view schematically showing a first moist powder.
Figure 7:
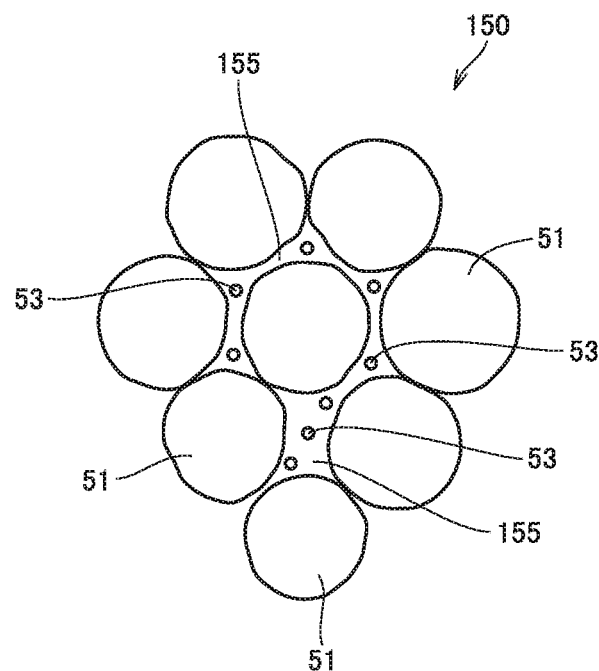
FIG. 7 is a cross sectional view schematically showing a second moist powder.
Figure 8:
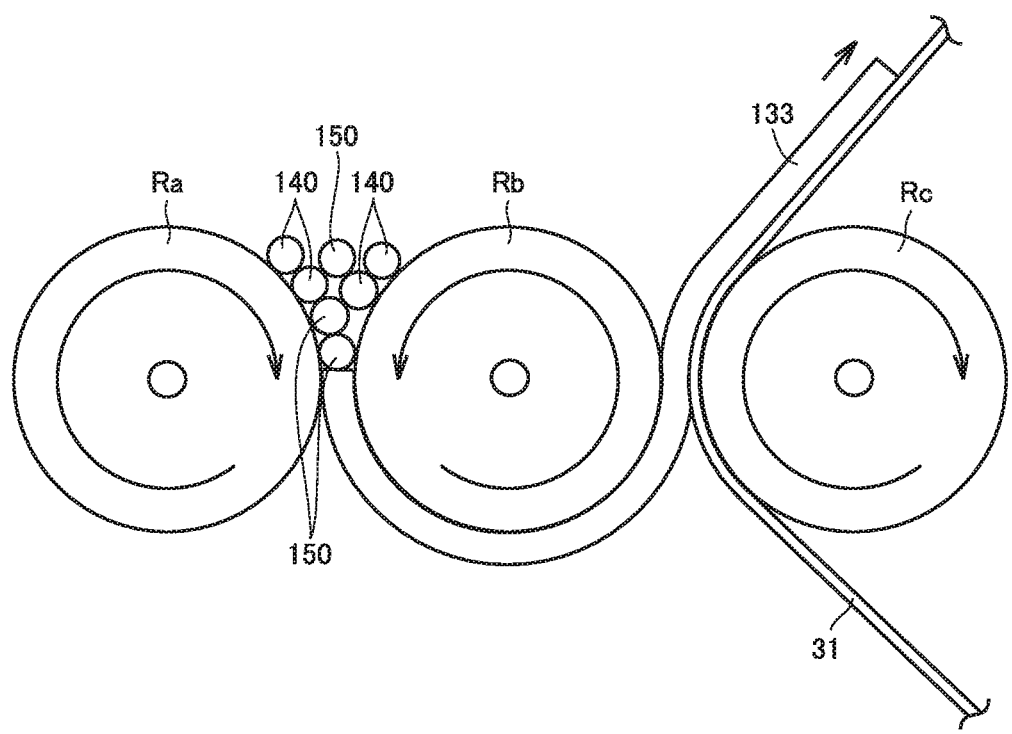
FIG. 8 is a side view showing one step of the method for producing the positive electrode of the nonaqueous electrolyte secondary battery in the embodiment of the present invention.

FIG. 5 is a flowchart showing a method for producing the positive electrode of the nonaqueous electrolyte secondary battery of the present embodiment in the order of steps. FIG. 6 is a cross sectional view schematically showing a first moist powder. FIG. 7 is a cross sectional view schematically showing a second moist powder. FIG. 8 is a side view showing one step of the method for producing the positive electrode of the nonaqueous electrolyte secondary battery in the present embodiment.

The method for producing positive electrode 3 preferably includes: a producing step S101 for first moist powder 140; a producing step S102 for second moist powder 150; a mixing step S103 for first moist powder 140 and second moist powder 150; and a transferring step S104.

(Production of First Moist Powder)

In producing step S101 for first moist powder 140, first moist powder 140 to serve as first powder 40 is produced. Specifically, first positive electrode active material 41, organic-based binder 43, and the first conductive material are mixed with one another and organic solvent 145 is then added thereto, thereby forming a powder. In this way, first moist powder 140 is obtained.

First moist powder 140 can be produced using a conventionally well-known powder forming device. First moist powder 140 preferably includes not less than 75 mass % of a first solid content and not more than 25 mass % of organic solvent 145, more preferably, not less than 80 mass % of the first solid content and not more than 20 mass % of organic solvent 145. It should be noted that the contents of first positive electrode active material 4, organic-based binder 43, and the first conductive material in the first solid content are as those described above in (First Powder). Moreover, in first moist powder 140, organic-based binder 43 is dissolved in organic solvent 145.

Organic solvent 145 is considered to hardly exist on the surface of first moist powder 140, and most of organic solvent 145 is held between, for example, adjacent first positive electrode active materials 41 (FIG. 6). For organic solvent 145, a solvent conventionally well-known as a solvent capable of dissolving an organic-based binder included in a positive electrode mixture layer of a nonaqueous electrolyte secondary battery can be used, such as NMP (N-methylpyrrolidone) or THF (tetrahydrofuran).

It should be noted that the form of first moist powder 140 is not limited to the form shown in FIG. 6. For example, the shape of first moist powder 140, the shape of first positive electrode active material 41, and the like are not limited to the shapes shown in FIG. 6. The number of first positive electrode active materials 41 is not limited to the number shown in FIG. 6.

(Production of Second Moist Powder)

In producing step S102 for second moist powder 150, second moist powder 150 to serve as second powder 50 is produced. Specifically, second positive electrode active material 51, water-based binder 53, and the second conductive material are mixed with one another, and water-based solvent 155 is then added, thereby forming a powder. In this way, second moist powder 150 is obtained.

Second moist powder 150 can be produced using a conventionally well-known powder forming device. Second moist powder 150 preferably includes not less than 75 mass % of a second solid content and not more than 25 mass of water-based solvent 155, more preferably, not less than 80 mass % of the second solid content and not more than 20 mass % of water-based solvent 155. It should be noted that the contents of second positive electrode active material 51, water-based binder 53, and the second conductive material in the second solid content are as those described above in (Second Powder). In second moist powder 150, water-based binder 53 is in the form of a particle or powder, and is dispersed in water-based solvent 155.

Water-based solvent 155 is considered to hardly exist on the surface of second moist powder 150, and most of water-based solvent 155 is held between, for example, adjacent second positive electrode active materials 51 (FIG. 7).

It should be noted that the form of second moist powder 150 is not limited to the form shown in FIG. 7. For example, the shape of second moist powder 150, the shape of second positive electrode active material 51, and the like are not limited to the shapes shown in FIG. 7. The number of second positive electrode active materials 51 is not limited to the number shown in FIG. 7.

(Mixing of First Moist Powder and Second Moist Powder)

In mixing step S103 for first moist powder 140 and second moist powder 150, first moist powder 140 and second moist powder 150 are mixed with each other.

As described above, organic solvent 145 is considered to hardly exist on the surface of first moist powder 140 and water-based solvent 155 is considered to hardly exist on the surface of second moist powder 150. Hence, even when first moist powder 140 and second moist powder 150 are mixed with each other, organic solvent 145 and water-based solvent 155 can be prevented from being brought into contact with each other. Accordingly, the mixture of first moist powder 140 and second moist powder 150 (hereinafter, referred to as "moist powder mixture") can be prevented from being gelled, so that the moist powder mixture can be transferred onto the surface of positive electrode collector 31 so as to produce positive electrode 3.

Each of the blending amounts of first moist powder 140 and second moist powder 150 is not particularly limited. Here, the "blending amount of first moist powder 140" refers to a ratio of the mass of the first solid content to the total of the mass of the first solid content and the mass of the second solid content. Similarly, the "blending amount of second moist powder 150" refers to a ratio of the mass of the second solid content to the total of the mass of the first solid content and the mass of the second solid content.

Preferably, the blending amount of first moist powder 140 is not less than 25 mass % and not more than 90 mass %. When the blending amount of first moist powder 140 is not less than 25 mass %, positive electrode mixture layer 33 includes not less than 25 mass % of first powder 40. Accordingly, the I-V resistance of the nonaqueous electrolyte secondary battery at a normal temperature can be reduced further. When the blending amount of first moist powder 140 is not more than 90 mass %, the blending amount of second moist powder 150 is not less than 10 mass %, so that positive electrode mixture layer 33 includes not less than 10 mass % of second powder 50. Accordingly, the I-V resistance of the nonaqueous electrolyte secondary battery at a low temperature can be reduced further. More preferably, the blending amount of first moist powder 140 is not less than 50 mass % and not more than 75 mass %.

Moreover, the blending amount of second moist powder 150 is preferably not less than 10 mass % and not more than 75 mass %. When the blending amount of second moist powder 150 is not less than 10 mass %, positive electrode mixture layer 33 includes not less than 10 mass % of second powder 50. Accordingly, the I-V resistance of the nonaqueous electrolyte secondary battery at a low temperature can be reduced further. When the blending amount of second moist powder 150 is not more than 75 mass %, the blending amount of first moist powder 140 is not less than 25 mass %, so that positive electrode mixture layer 33 includes not less than 25 mass % of first powder 40. Accordingly, the I-V resistance of the nonaqueous electrolyte secondary battery at a normal temperature can be reduced further. More preferably, the blending amount of second moist powder 150 is not less than 25 mass % and not more than 50 mass %.

First moist powder 140 and second moist powder 150 can be mixed with each other using a conventionally well-known mixing device. Although the mixing condition is not particularly limited, first moist powder 140 and second moist powder 150 are preferably mixed with each other so as not to crush each of first moist powder 140 and second moist powder 150. Accordingly, contact can be further prevented between organic solvent 145 existing in first moist powder 140 and water-based solvent 155 existing in second moist powder 150, whereby the moist powder mixture can be further prevented from being gelled.

(Transfer)

In transferring step S104, the moist powder mixture is pressed against the surface of positive electrode collector 31 and is then dried. Accordingly, on the surface of positive electrode collector 31, organic solvent 145 is removed from first moist powder 140 and first powder 40 is obtained, and water-based solvent 155 is removed from second moist powder 150 and second powder 50 is obtained. In this way, positive electrode mixture layer 33 including first powder 40 and second powder 50 is formed on the surface of positive electrode collector 31.

For example, the moist powder mixture can be pressed against the surface of positive electrode collector 31 using a shaping/transferring device shown in FIG. 8. In the shaping/transferring device shown in FIG. 8, a first roll Ra, a second roll Rb, and a third roll Rc are respectively rotated in directions of arrows shown in FIG. 8, whereby positive electrode collector 31 is conveyed through between second roll Rb and third roll Rc in a direction of an arrow shown in FIG. 8.

When the moist powder mixture is supplied between first roll Ra and second roll Rb, the moist powder mixture is compressed by first roll Ra and second roll Rb to become a shaped body 133. By this compression, water-based binder 53 of second moist powder 150 is crushed, with the result that water-based binder 53 in the form of a particle or powder is formed into a shape of line and is then wound around the surface of the aggregated material (FIG. 4).

The shaped body (this shaped body is to serve as positive electrode mixture layer 33) 133 obtained by the compression is conveyed on second roll Rb, is moved to a position between second roll Rb and third roll Rc, and is pressed against one surface of positive electrode collector 31 between second roll Rb and third roll Rc. By drying such a shaped body 133, positive electrode mixture layer 33 is formed on one surface of positive electrode collector 31. In accordance with the method described above, positive electrode mixture layer 33 can be formed also on the other surface of positive electrode collector 31, whereby positive electrode mixture layers 33 can be formed on both the surfaces of positive electrode collector 31.

In transferring step S104, shaped body 133 may be pressed against one surface of positive electrode collector 31 while drying shaped body 133. For example, when a heated roll is used as third roll Rc, shaped body 133 can be pressed against one surface of positive electrode collector 31 while drying shaped body 133.

When water-based solvent 155 included in second moist powder 150 is an aqueous solution containing a small amount of alcohol, second moist powder 150 can be improved in terms of a transfer property. In other words, during the pressing, second moist powder 150 can be prevented from remaining on the circumferential surface of second roll Rb.

Preferably, the moist powder mixture is pressed against the surface of positive electrode collector 31 provided with positive electrode mixture layer 33, so as to form the positive electrode side non-applied portion at one end in the width direction of positive electrode collector 31.

EXAMPLES

The following describes the present invention more in detail with reference to examples, but the present invention is not limited to these.

Example 1

(Production of Positive Electrode)
(Production of First Moist Powder)
As the first positive electrode active material, powders (having au average particle size of 10 micrometers) were prepared each of which was composed of a complex oxide including Li and three transition metal elements (Ni, Co, and Mn) (Ni:Co:Mn=1:1:1 (molar ratio)). As the first conductive material, acetylene black (registered trademark "DENKA BLACK" provided by DENKI KAGAKU KOGYO K.K.) was prepared. As the organic-based binder, PVDF powders (grade number "W #1300" provided by Kureha Battery Materials Japan Co., Ltd) were prepared.

Next, the first positive electrode active material, the first conductive material, and the organic-based binder were introduced into a High Flex Gral (item number "LHF-GS-2J" provided by EARTHTECHNICA CO., LTD) to attain a mass ratio of 93:4:3. The first positive electrode active material, the first conductive material, and the organic-based binder were agitated for 2 minutes with the rotational speed of an agitator blade being set at 200 rpm (rotation per minute) and the rotational speed of a chopper blade being set at 1000 rpm. In this way, the first solid content was obtained.

Then, NMP was added to the High Flex Gral. In doing so, the amount of addition of the NMP was adjusted such that the content of the first solid content in the first moist powder became 81 mass %. The first solid content and the NMP were agitated for 5 minutes with the rotational speed of the agitator blade being set at 200 rpm and the rotational speed of the chopper blade being set at 3000 rpm. In this way, the first moist powder was obtained, (Production of Second Moist Powder)
For the second positive electrode active material, the same material as the above-described first positive electrode active material was prepared, while for the second conductive material, the same material as the above-described first conductive material was prepared. For the water-based binder, a PTFE-water dispersion (obtained by dispersing PTFE in water; item number "D-210C" provided by Daikin Industries, LTD.) was prepared. Furthermore, for a thickener, CMC (carboxymethyl cellulose) (item number "BSH-12" provided by DAI-ICHI KOGYO SEIYAKU CO., LTD.) was prepared.

Next, the second positive electrode active material, the second conductive material, the CMC, and the water-based binder were introduced into the High Flex Gral to attain a mass ratio of 93:4:2:1. The second positive electrode active material, the second conductive material, the CMC, and the water-based binder were agitated for 2 minutes with the rotational speed of the agitator blade being set at 200 rpm and the rotational speed of the chopper blade being set at 1000 rpm. In this way, the second solid content was obtained.

Then, water was added to the High Flex Gral. In doing so, the amount of addition of the water was adjusted such that the content of the second solid content in the second moist powder becomes 81 mass %. The second solid content and the water were agitated for 5 minutes with the rotational speed of the agitator blade being set at 200 rpm and the rotational speed of the chopper blade being set at 3000 rpm. In this way, the second moist powder was obtained.

(Mixing of First Moist Powder and Second Moist Powder)
The first moist powder and the second moist powder were mixed with each other with the blending amount of the first moist powder being set at 90 mass % and the blending amount of the second moist powder being set at 10 mass %. In doing so, a mixing condition for the first moist powder and the second moist powder was adjusted so as not to deform each of the first moist powder and the second moist powder.

(Transfer)
The shaping/transferring device shown in FIG. 8 was used to transfer the mixture of the first moist powder and the second moist powder (moist powder mixture) onto the positive electrode collector. Specifically, the moist powder mixture was supplied between first roll Ra and second roll Rb with the positive electrode collector (aluminum foil having a thickness of 15 micrometers) passing through between second roll Rb and third roll Rc so as to convey it in the direction of arrow. In this way, the moist powder mixture was compressed by first roll Ra and second roll Rb and was accordingly shaped into a shape of layer, and the obtained shaped body was pressed against one surface of the positive electrode collector between second roll Rb and third roll Rc.

After drying the shaped body thus pressed against the one surface of the positive electrode collector, another shaped body was pressed against the other surface of the positive electrode collector and was dried. The resulting layered body was rolled to have a predetermined thickness and then was cut into a predetermined size. In this way, the positive electrode was obtained in which the positive electrode mixture layers were formed on both the surfaces of the positive electrode collector.

Here, the amount of supply of the moist powder mixture was adjusted such that a fixing amount thereof on each of the surfaces of the positive electrode collector (after the drying) became 30 mg/cm$^2$. Moreover, the shaped body was pressed against each of the surfaces of the positive electrode collector such that the portion (positive electrode side non-applied portion) in which the positive electrode collector was exposed from the moist powder mixture was formed at one end in the width direction of the positive electrode collector.

(Production of Negative Electrode)

Scaly graphite (having an average particle size of 10 micrometers) was prepared as the negative electrode active material. The negative electrode active material, SBR (binder) and a sodium salt of CMC were mixed to attain a mass ratio of 98:1:1 (mixing by a planetary mixer), and were diluted with water. In this way, a negative electrode mixture slurry was obtained.

The negative electrode mixture slurry was applied to both the surfaces of the negative electrode collector such that a portion (negative electrode side non-applied portion) in which a Cu foil (negative electrode collector) was exposed from the negative electrode mixture slurry was formed at one end in the width direction of the negative electrode collector. The amount of application of the negative electrode mixture slurry was adjusted such that the amount of application on each of the surfaces of the negative electrode collector (after drying) becomes 18 mg/cm$^2$. Then, the negative electrode mixture slurry applied to both the surfaces of the negative electrode collector was dried. The resulting layered product was rolled to have a predetermined thickness and was then cut into a predetermined size. In this way, the negative electrode was obtained which had the negative electrode mixture layers formed on both the surfaces of the negative electrode collector.

(Production and Insertion of Electrode Body)

First, a separator (thickness: 25 micrometers; width: 59.5 mm) made of PE (polyethylene) was prepared. The positive electrode, the negative electrode, and the separator were arranged such that the separator was provided between the positive electrode mixture layer and the negative electrode mixture layer and the positive electrode side non-applied portion and the negative electrode side non-applied portion were projected from the separator oppositely in the width direction of the positive electrode collector (or the negative electrode collector). Next, a winding shaft was arranged in parallel with the width direction of the positive electrode collector (or the negative electrode collector), and the positive electrode, the separator, and the negative electrode were wound using the winding shaft. In this way, a cylindrical electrode body was obtained.

Next, a cover body of the battery case provided with a positive electrode terminal and a negative electrode terminal was prepared. The positive electrode side non-applied portion and the positive electrode terminal are connected to each other using a positive electrode lead, and the negative electrode side non-applied portion and the negative electrode terminal were connected to each other using a negative electrode lead. Then, the electrode body was introduced into the case body of the battery case, and the opening of the case body was closed by the cover body.

(Preparation and Introduction of Nonaqueous Electrolytic Solution)

EC (ethylene carbonate), EMC (ethyl methylcarbonate), and DMC (dimethyl carbonate) were mixed with one another so as to attain a volume ratio of 3:5:2, thereby obtaining a mixed solvent. Into this mixed solvent, LiPF$_6$ was introduced to attain a concentration of 1.0 mol/L. After introducing the prepared nonaqueous electrolytic solution via a liquid introduction opening of the cover body, pressure in the battery case was decreased. Accordingly, the positive electrode mixture layer, the negative electrode mixture layer, and the separator were impregnated with the nonaqueous electrolytic solution. Then, the liquid introduction opening was sealed, thereby obtaining a lithium ion secondary battery (diameter: 18 mm; height: 65.0 mm; theoretical capacity: 1.0 Ah) of the present example.

Examples 2 to 5

In accordance with the method described above in Example 1, lithium ion secondary batteries were produced except that the blending amount of the first moist powder and the blending amount of the second moist powder were changed to values shown in Table 1.

Comparative Example 1

In accordance with the method described above in Example 1, a lithium ion secondary battery was produced except that the positive electrode was produced in accordance with a method illustrated below.

First, the same positive electrode active material as the first positive electrode active material of Example 1 was prepared as the positive electrode active material, the same conductive material as the first conductive material of Example 1 was prepared as the conductive material, and the same binder as the organic-based binder of Example 1 was prepared as the binder. The positive electrode active material, the conductive material, and the binder were mixed to attain a mass ratio of 98:1:1 (mixing by a planetary mixer), and were diluted with NMP. In this way, an organic-based slurry was obtained.

The organic-based slurry was applied to both the surfaces of the positive electrode collector such that a portion (positive electrode side non-applied portion) in which the Al foil (positive electrode collector) was exposed from the organic-based slurry was formed at one end in the width direction of the positive electrode collector. The amount of application of the organic-based slurry was adjusted such that the amount of application on each of the surfaces of the positive electrode collector (after drying) became 30 mg/cm$^2$. Then, the organic-based slurry applied to both the surfaces of the positive electrode collector was dried. The resulting layered product was rolled to have a predetermined thickness and was then cut into a predetermined size. In this way, the positive electrode was obtained which had the positive electrode mixture layers formed on both the surfaces of the positive electrode collector.

Comparative Example 2

In accordance with the method described above in Comparative Example 1, the positive electrode mixture slurry (water-based slurry) was produced except that the same water-based binder as the water-based binder of Example 1 was used as the binder, and the positive electrode was produced using the water-based slurry. Regarding the other points, a lithium ion secondary battery was produced in accordance with the method described in Example 1.

Comparative Example 3

The organic-based slurry of Comparative Example 1 and the water-based slurry of Comparative Example 2 were mixed with the blending amount of the organic-based slurry of Comparative Example 1 being set at 50 mass % and the blending amount of the water-based slurry of Comparative Example 2 being set at 50 mass %. Accordingly, gelling took place. Hence, no positive electrode could be produced, giving up production of a lithium ion secondary battery.

Comparative Examples 4 and 5

In accordance with the method described above in Example 1, lithium ion secondary batteries were produced except that the blending amount of the first moist powder and the blending amount of the second moist powder were changed to values illustrated in Table 1.

<Measurement of I-V Resistance at 25° C.>

First, the lithium ion secondary battery of Example 1 was adjusted a SOC (State of Charge) of 20%. Next, under an environment of 25° C., discharging was performed for 10 seconds with a current of 10 C (current 10 times as large as the capacity of the battery), and then a voltage change amount (ΔV) was found. The found ΔV was divided by the current, thereby finding the I-V resistance. The series of operations were performed for five lithium ion secondary batteries, and the average value thereof was calculated. In a similar way, the I-V resistances (average values) of the lithium ion secondary batteries of Examples 2 to 5 and Comparative Examples 1 to 5 (except Comparative Example 3) at 25° C. were calculated.

<Measurement of I-V Resistance at −15° C.>

In accordance with the method described above in <Measurement of I-V Resistance at 25° C.>, the I-V resistances (average values) at −15° C. were found except that the voltage change amount (ΔV) was found under an environment of −15° C.

<Measurement of Peel Strength>

The positive electrode was removed from the lithium ion secondary battery of Example 1, and measurement was performed with respect to strength (peel strength of the positive electrode mixture layer) required to peel the positive electrode mixture layer from the positive electrode collector. Specifically, a 90° peel test was performed based on a method described in JIS C 5016 so as to find a peel strength (per unit length) of the positive electrode mixture layer. The series of operations were performed for positive electrodes removed from three lithium ion secondary batteries, and an average value thereof was calculated. In a similar way, the peel strength (per unit length) of the positive electrode mixture layer in each of Examples 2 to 5 and Comparative Examples 1 to 5 (except Comparative Example 3) was found. A larger peel strength indicates that it is more difficult to peel the positive electrode mixture layer from the positive electrode collector.

Results are illustrated in Table 1 an 9 to FIG. 11.

TABLE 1

| | Positive Electrode Mixture Layer | | | | | | |
|---|---|---|---|---|---|---|---|
| | Blending Amount (Mass %) | | | | | I-V Resistance | I-V Resistance | |
| | First Moist Powder | Second Moist Powder | Organic-Based Slurry | Water-Based Slurry | Formation Method | at 25° C. (mΩ) | at −15° C. (mΩ) | Peel Strength (N/m) |
| Comparative Example 1 | — | — | 100 | 0 | Application | 29.3 | 442 | 4.3 |
| Comparative Example 2 | — | — | 0 | 100 | Application | 33.5 | 362 | 0.9 |
| Comparative Example 3 | — | — | 50 | 50 | Not Formed | — | — | — |
| Comparative Example 4 | 100 | 0 | — | — | Transfer | 29.0 | 430 | 5.1 |
| Example 1 | 90 | 10 | — | — | Transfer | 29.0 | 410 | 5.0 |
| Example 2 | 75 | 25 | — | — | Transfer | 29.2 | 380 | 4.7 |
| Example 3 | 50 | 50 | — | — | Transfer | 29.5 | 370 | 4.6 |
| Example 4 | 25 | 75 | — | — | Transfer | 30.2 | 363 | 4.2 |
| Example 5 | 10 | 90 | — | — | Transfer | 31.3 | 357 | 1.4 |
| Comparative Example 5 | 0 | 100 | — | — | Transfer | 33.2 | 355 | 1.2 |

In each of Comparative Examples 1 and 4, the I-V resistance at −15° C. was increased as compared with each of Examples 1 to 5. This is presumably because the positive electrode mixture layer does not include the water-based binder. Moreover, it was found that when the positive electrode mixture layer does not include the water-based binder, the I-V resistance at −15° C. is increased irrespective of the method of forming the positive electrode mixture layer.

In each of Comparative Examples 2 and 5, the I-V resistance at 25° C. was increased and the peel strength was decreased as compared with Examples 1 to 5. This is presumably because the positive electrode mixture layer does not include the organic-based binder. Moreover, it was found that when the positive electrode mixture layer does not include the organic-based binder, the I-V resistance at 25° C. is increased irrespective of the method of forming the positive electrode mixture layer.

On the other hand, in each of Examples 1 to 5, the I-V resistance at 25° C. and the I-V resistance at −15° C. were suppressed low and the peel strength was large. Accordingly, it was found that when the positive electrode mixture layer is formed using the first moist powder and the second moist powder, the I-V resistance of the nonaqueous electrolyte secondary battery at a normal temperature and the I-V resistance of the nonaqueous electrolyte secondary battery at a low temperature can be reduced and the positive electrode mixture layer can be prevented from being peeled.

Figure 9:
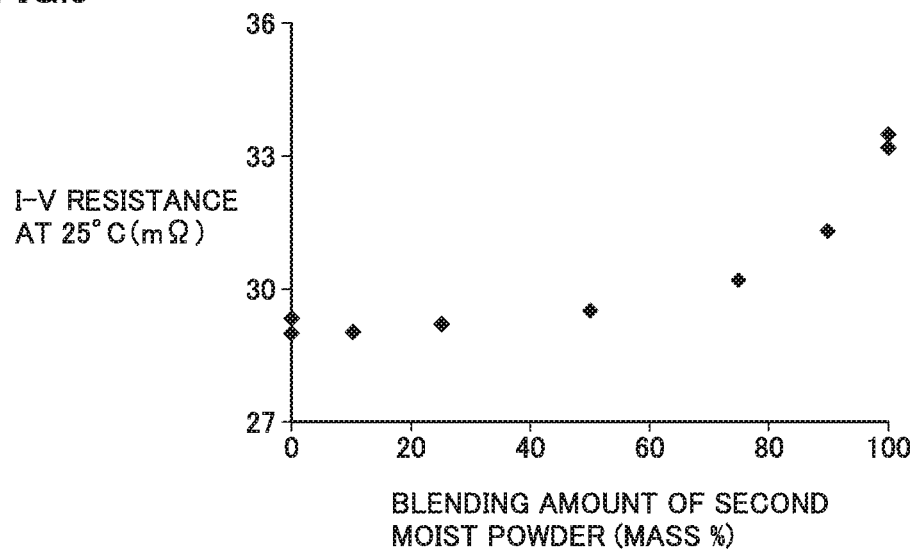
FIG. 9 is a graph showing a result of an example.
Figure 10:
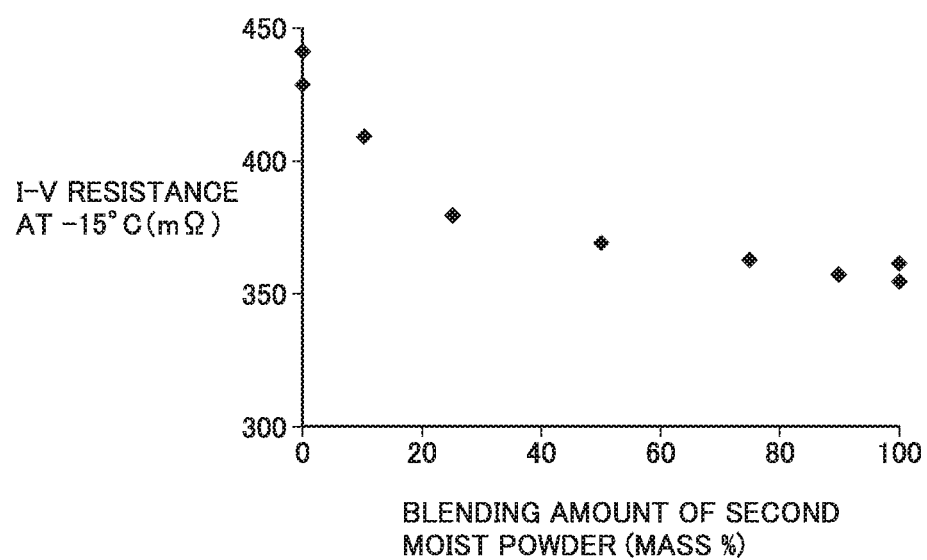
FIG. 10 is a graph showing a result of the example.

As the blending amount of the second moist powder was increased, the I-V resistance at 25° C. was increased (FIG. 9) and the peel strength was decreased (FIG. 11), but the I-V resistance at −15° C. was decreased (FIG. 10). In particular, in each of Examples 1 to 4, the I-V resistance at 25° C. was lower and the peel strength was larger than those in Example 5. Accordingly, it was found that when the blending amount of the second moist powder is not less than 10 mass % and not more than 75 mass %, the I-V resistance of the nonaqueous electrolyte secondary battery at a normal temperature can be reduced further and the positive electrode mixture layer can be further prevented from being peeled.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

For example, the nonaqueous electrolyte secondary battery is preferably a lithium ion secondary battery. The nonaqueous electrolyte secondary battery is not limited to a cylindrical secondary battery, and may be a rectangular secondary battery. The battery case preferably has a configuration conventionally well-known as a battery case of a nonaqueous electrolyte secondary battery, and is not limited to the configuration described in the above-described examples. The sealing structure for the battery case preferably has a configuration conventionally well-known as a sealing structure for a battery case of a nonaqueous electrolyte secondary battery, and is not limited to the configuration described in the above-described examples.

REFERENCE SIGNS LIST

1: battery case; 3: positive electrode; 5: separator; 7: negative electrode; 9: electrode body; 31: positive electrode collector; 33: positive electrode mixture layer; 40: first powder; 41: first positive electrode active material; 43: organic-based binder; 50: second powder; 51: second positive electrode active material; 53: water-based binder; 140: first moist powder; 145: organic solvent; 150: second moist powder; 155: water-based solvent.

The invention claimed is:

1. A nonaqueous electrolyte secondary battery comprising a positive electrode, a negative electrode, a separator provided between said positive electrode and said negative electrode, and a nonaqueous electrolytic solution at least held by said separator,
said positive electrode having a positive electrode collector and a positive electrode mixture layer provided on said positive electrode collector,
said positive electrode mixture layer having a first powder and a second powder, said first powder including a first positive electrode active material, a first conductive material, and an organic-based binder, said second powder including a second positive electrode active material, a second conductive material, and a water-based binder,
in the entirety of said positive electrode mixture layer, said first powder and said second powder being mixed with each other,
wherein the organic-based binder is polyvinylidene difluoride, polyethylene oxide, polyacrylonitrile, or poly(methylmethacrylate), and
the water-based binder is polytetrafluoroethylene, fluoro ethylene propylene, or perfluoroalkoxy.

2. The nonaqueous electrolyte secondary battery according to claim 1, wherein said positive electrode mixture layer includes not less than 10 mass % and not more than 75 mass % of said second powder.

3. The nonaqueous electrolyte secondary battery according to claim 1, wherein first powder comprises not less than 86 mass % and not more than 99.3 mass % of first positive electrode active material, not less than 0.2 mass % and not more than 4 mass % of the organic-based binder, and not less than 0.5 mass % and not more than 10 mass % of the first conductive material.

4. The nonaqueous electrolyte secondary battery according to claim 1, wherein second powder comprises not less than 86 mass % and not more than 99.3 mass % of second positive electrode active material, not less than 0.2 mass % and not more than 4 mass % of water-based binder, and not less than 0.5 mass % and not more than 10 mass % of the second conductive material.

5. A nonaqueous electrolyte secondary battery comprising a positive electrode, a negative electrode, a separator provided between said positive electrode and said negative electrode, and a nonaqueous electrolytic solution at least held by said separator,
said positive electrode having a positive electrode collector and a positive electrode mixture layer provided on said positive electrode collector,
said positive electrode mixture layer having a first powder and a second powder, said first powder including a first positive electrode active material, a first conductive material, and an organic-based binder, said second powder including a second positive electrode active material, a second conductive material, and a water-based binder,
in the entirety of said positive electrode mixture layer, said first powder and said second powder being mixed with each other,
wherein first powder comprises not less than 86 mass % and not more than 99.3 mass % of first positive electrode active material, not less than 0.2 mass % and not more than 4 mass % of the organic-based binder, and not less than 0.5 mass % and not more than 10 mass % of the first conductive material.

6. The nonaqueous electrolyte secondary battery according to claim 5, wherein said positive electrode mixture layer includes not less than 10 mass % and not more than 75 mass % of said second powder.

7. The nonaqueous electrolyte secondary battery according to claim 5, wherein second powder comprises not less than 86 mass % and not more than 99.3 mass % of second positive electrode active material, not less than 0.2 mass % and not more than 4 mass % of water-based binder, and not less than 0.5 mass % and not more than 10 mass % of the second conductive material.

8. A nonaqueous electrolyte secondary battery comprising a positive electrode, a negative electrode, a separator provided between said positive electrode and said negative electrode, and a nonaqueous electrolytic solution at least held by said separator,
said positive electrode having a positive electrode collector and a positive electrode mixture layer provided on said positive electrode collector,
said positive electrode mixture layer having a first powder and a second powder, said first powder including a first positive electrode active material, a first conductive material, and an organic-based binder, said second powder including a second positive electrode active material, a second conductive material, and a water-based binder, in the entirety of said positive electrode mixture layer, said first powder and said second powder being mixed with each other, wherein second powder comprises not less than 86 mass % and not more than 99.3 mass % of second positive electrode active material, not less than 0.2 mass % and not more than 4 mass % of water-based binder, and not less than 0.5 mass % and not more than 10 mass % of the second conductive material.

9. The nonaqueous electrolyte secondary battery according to claim 8, wherein said positive electrode mixture layer includes not less than 10 mass % and not more than 75 mass % of said second powder.

\* \* \* \* \*